(No Model.)

E. L. D. HOYLE.
BATTER DROPPER.

No. 518,035. Patented Apr. 10, 1894.

WITNESSES:
Henry Grabau
Martin Finnerty

INVENTOR
Ella L. D. Hoyle.
by W. R. Stringfellow
ATTORNEY

United States Patent Office.

ELLA L. D. HOYLE, OF NEW ORLEANS, LOUISIANA.

BATTER-DROPPER.

SPECIFICATION forming part of Letters Patent No. 518,035, dated April 10, 1894.

Application filed November 10, 1893. Serial No. 490,536. (No model.)

*To all whom it may concern:*

Be it known that I, ELLA LOISA DUFF HOYLE, a citizen of the United States, residing at New Orleans, in the parish of Orleans and State of Louisiana, have invented certain new and useful Improvements in Batter-Dropper; and I do declare the following to be a full, clear, and exact description of the invention, such as will enable others skilled in the art to which it appertains to make and use the same.

My invention relates to an improvement in a batter dropper, and its novelty will be fully understood from the following description and claim when taken in connection with the annexed drawings, and the objects of my invention are to provide a new, and useful device for dropping batter and obviating the necessity of using a spoon for placing batter in a cooking utensil. I attain these objects by the mechanism illustrated in the accompanying drawings, in which—

Figure 1:
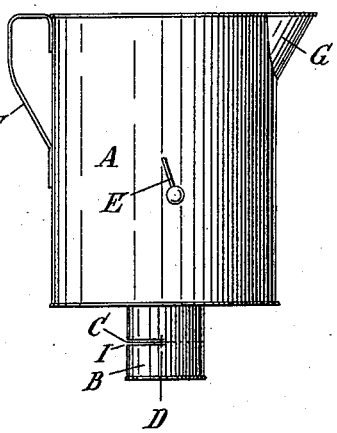
Figure 2:
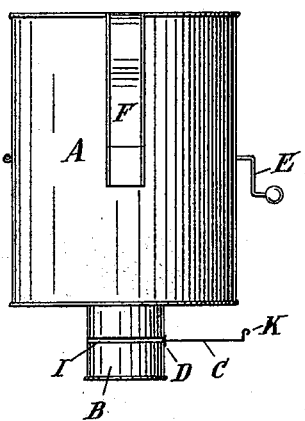
Figure 3:
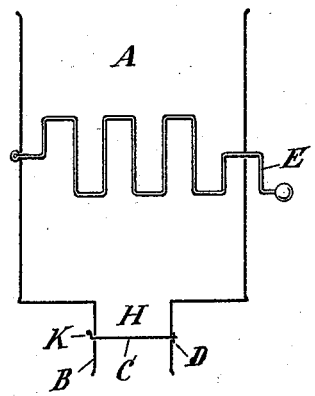
Figure 4:
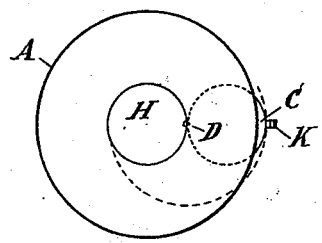

Figure 1. is a side view. Fig. 2. is a rear view. Fig. 3. is a vertical section. Fig. 4. is a horizontal section.

Similar letters refer to similar parts throughout the several views.

In the drawings A refers to the body of a vessel which is provided at the bottom with an outlet H communicating with a downwardly projecting outlet spout B rigidly secured to the bottom of the body and in which there is a slot I having a slide C, which is pivoted at D, and having a handle K, which enables the slide C to be worked back and forth around its pivot D as indicated in Fig. 4.

Placed within the body A is a reel or agitator, which has a crank E by means of which the reel or agitator can be rotated. F designates the handle of the body A and G a spout.

In practice the batter can be prepared either in the vessel A, or in a separate vessel as may be desired, and while deposited in the body A the reel or agitator is rotated in order to keep the batter at the proper consistency, and when it is desired to cook the batter, it is discharged through the outlet spout B by means of the slide C, thus permitting a given quantity to be deposited rapidly without dipping same with a spoon, and thereby saving time and labor.

It will be noticed that the upper part of the discharge spout B is always full of the batter which runs down therein until all strikes the slide C; and when the latter is moved to one side to wholly or partially open the passage through this spout, the batter flows downward throughout the remainder of the spout and out at its lower end—being quickly and completely cut off when the slide is returned to its original position, as shown in Fig. 3. I am aware that a device has been heretofore patented in which the slide carried the spout and the bottom of the main vessel was simply provided with a hole over which the spout was carried by the movement of the slide, but I consider my present invention an improvement over that patent in that the batter always stands in the upper end of the spout and cannot leak if the pivot of the slide should become loose or the parts thereof slightly worn in use. Moreover, the slide in the present instance is stationary and the operator can more easily direct the dropping of the batter at the proper and desired point.

It will be seen that the spout B is so small in diameter that, if desired, the entire vessel can be placed in a griddle-hole with the bottom of its body resting on the stove-top around such hole or in the groove immediately around the hole, and the spout will project below the stove-top through the hole. The specific shape of the slide C and its handle permit this. Again, if it be desired to cook the contents of this vessel A within another vessel containing water, it can be easily done and the water will entirely surround the contents of the vessel A, because the slide C is raised above the lower end of the spout B whose lower end in turn rests upon the bottom of the inclosing vessel.

A striking advantage of my invention is its economical construction and ease by which the same may be operated.

Having described my invention, what I claim, and desire to secure by Letters Patent, is—

The herein described batter dropper, the same comprising a vessel having a flat bottom with a hole in the center thereof, smaller than the diameter of said bottom a vertical cylindrical discharge spout rigidly secured to said bottom around the hole and having a slot in one side at a point midway between its upper and lower ends, and a circular slide pivoted to the spout at one end of the slot therein and having a handle at a point opposite said pivot, all as and for the purpose set forth.

In testimony whereof I affix my signature in presence of two witnesses.

ELLA L. D. HOYLE.

Witnesses:
 WM. H. WRIGHT,
 WM. C. FULHAM.